United States Patent [19]

Wahli

[11] Patent Number: 4,574,692
[45] Date of Patent: Mar. 11, 1986

[54] PROCESS AND APPARATUS FOR THE PREPARATION OF PHOTOGRAPHIC COPIES

[75] Inventor: Robert Wahli, Unterengstringen, Switzerland

[73] Assignee: GRETAG Aktiengesellschaft, Regensdorf, Switzerland

[21] Appl. No.: 658,367

[22] Filed: Oct. 5, 1984

[30] Foreign Application Priority Data

Oct. 5, 1983 [CH] Switzerland ............... 5402/83

[51] Int. Cl.⁴ .................. G03B 27/32; G03B 27/52
[52] U.S. Cl. .......................... 101/2; 270/55; 355/40; 355/77; 355/132; 53/55; 53/493; 53/520
[58] Field of Search ........... 101/2; 355/88, 112, 355/132, 77, 106, 107, 40; 270/55, 57, 58; 53/55, 493, 520, 131, 137

[56] References Cited

U.S. PATENT DOCUMENTS

| | | | |
|---|---|---|---|
| 3,576,369 | 4/1971 | Wick | 355/132 X |
| 3,733,018 | 5/1973 | Bretmayer | 226/2 |
| 3,768,905 | 10/1973 | Williams | 355/112 X |
| 3,875,861 | 4/1975 | Stackig | 226/28 X |
| 3,947,109 | 3/1976 | Kinder et al. | 355/112 X |
| 3,976,376 | 8/1976 | Hujer | 355/40 |
| 4,115,981 | 9/1978 | Hell et al. | 53/55 |
| 4,264,197 | 4/1981 | Pone et al. | 355/112 |
| 4,293,215 | 10/1981 | Rosborough, Jr. et al. | 355/40 |
| 4,294,537 | 10/1981 | Laska | 355/88 |
| 4,340,286 | 7/1982 | Carr | 354/105 |
| 4,417,811 | 11/1983 | Hamer | 355/77 |
| 4,432,637 | 2/1984 | Baschung | 355/40 X |
| 4,441,807 | 4/1984 | Bartz | 355/40 |

Primary Examiner—E. H. Eickholt
Attorney, Agent, or Firm—Burns, Doane, Swecker & Mathis

[57] ABSTRACT

In a photofinishing operation, the correlation of order envelopes, films and the paper prints produced therefrom is carried out automatically. The order envelopes, films and the strip of paper prints are provided with the same machine-readable control number per order. These control numbers are monitored during final processing by machine and, in case of a lack of agreement, the cutting of the film and the paper is prevented and an appropriate alarm is actuated.

11 Claims, 6 Drawing Figures

PROCESS AND APPARATUS FOR THE PREPARATION OF PHOTOGRAPHIC COPIES

BACKGROUND OF THE INVENTION

The present invention relates to a process and an apparatus for the preparation of photographic copies wherein an order envelope, the film master and the film prints must be correlated throughout processing and brought together when processing is complete.

In the processing of amateur orders in a photofinishing laboratory one of the problems encountered is to insure, by means of suitable measures, that the films delivered in an order envelope (in the form of rolls, discs or strips) are reunited after copying, together with the prints produced in the laboratory, in the order envelope and returned in this envelope to the customer. The measures undertaken for this purpose generally consist of providing the film to be copied with a control (or twin check) number on an adhesive label upon its removal from the envelope and applying the same number (by means of an adhesive label) to the order envelope. It is possible, by means of the twin check number, to reunite the film and the order envelope after a temporary separation for printing. To complete the order correctly, it is also necessary to establish the proper correlation between the film and the paper prints produced therefrom. For this purpose, the films are usually spliced together into a long strip for development and printing, and numbered in a continuous manner. Consequently, the paper images produced from them are also located in the same order on a strip of paper. It is then sufficient to visually compare the first negative of a film with the first paper image of the same order and to ascertain in this manner that the film and the paper images belong to the same order.

In a more sophisticated form of this method the film is scanned by a color video camera so that the negatives may be displayed in an enlarged form as positives on a color monitor, whereby the comparison with the color images is facilitated and made more secure.

Further adaptations are known wherein both the film negatives and the paper images are scanned and compared at the same scale with each other on the same monitor. This method also requires that the agreement of the negative and the positive be established by an operator. This activity requires high concentration and is therefore tiring over an extended period of time. In addition, it affects the integrity of the coordination.

OBJECTS AND BRIEF STATEMENT OF THE INVENTION

It is therefore an object of the present invention to provide a novel process for the automatic machine coordination of an order envelope, the film contained therein and the paper prints produced from the film at the end of a processing line independently of an operator. A further object of the invention lies in providing a suitable apparatus which embodies this process.

The process according to the invention and the corresponding apparatus attain these objects by applying a machine-readable control number to the order envelope and the film. This number is read from the film in a printing station and applied to the print paper in a machine readable form. In a final processing station, the control numbers on the envelope, film and print order are read and compared with one another by a machine to insure the integrity of the photofinishing operation.

The advantages of the process and apparatus of the invention can be found not only in the increased safety of the correlation of the order envelope, the film and the paper images, but also in a possible increase in the efficiency of the cutting and packaging of the film and the paper.

DETAILED DESCRIPTION OF THE ILLUSTRATED EMBODIMENT

Figure 1:
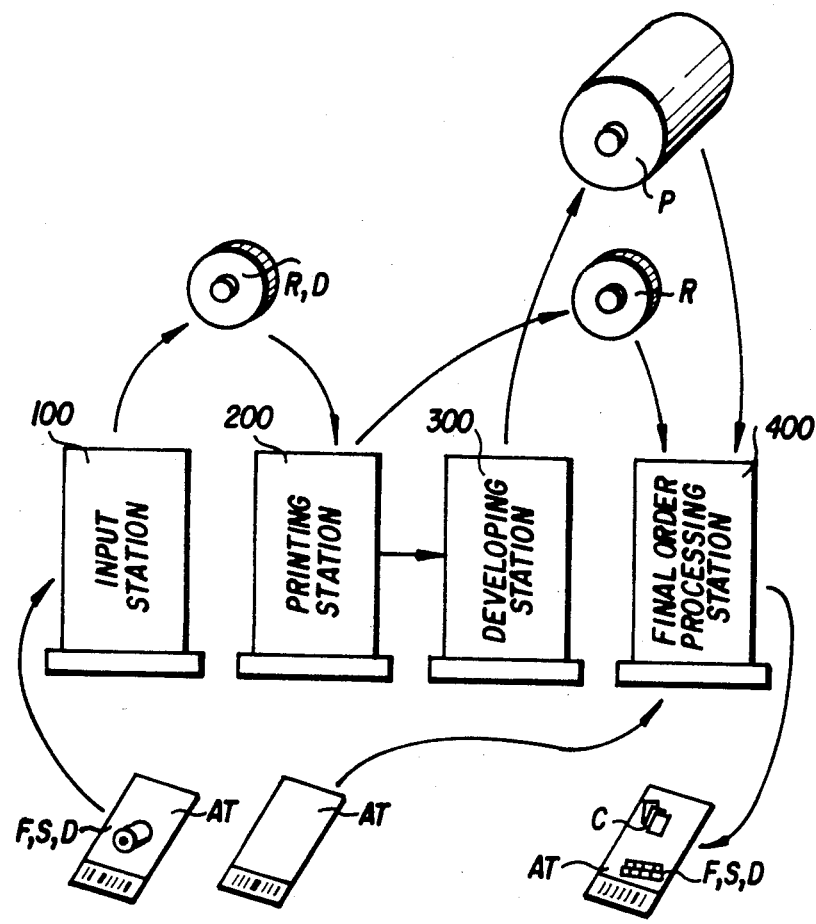
FIG. 1 shows, in a greatly simplified form, the fundamental configuration of an apparatus for the preparation of photographic copies.

Referring to FIG. 1, a photofinishing system comprises an input station 100, a printing station 200, a developing station 300 and the final order processing station 400.

In the input station 100 the master films delivered in the order envelopes AT (consisting of film discs D, film rolls F or film strips S) are removed from the order envelopes and prepared for further processing. Film discs D, after removal from their protective containers DB (FIG. 4), are introduced into a disc magazine equipped with a spindle. Film rolls F are combined in a splicing device (FIG. 2) into a larger copy roll R. Film strips S are combined in a similar fashion, with the aid of a carrier web T (FIG. 3). The individual order envelopes AT and the films D, F or S delivered in them are provided with a control number (twin-check number) TC and, if necessary (for example in the case of reorders), various order data, such as negative numbers, number of copies, etc.

To this extent, the input station and its mode of operation correspond to the state of the art. In contrast to these, however, according to the invention the identification of the order envelopes and films D, F or S is not effected with adhesive labels having control numbers printed on them in ordinary script. Rather, the control numbers TC are applied to the films and the order envelopes, preferably by printing, in the form of a machine readable code, in particular a bar code.

Figure 2:
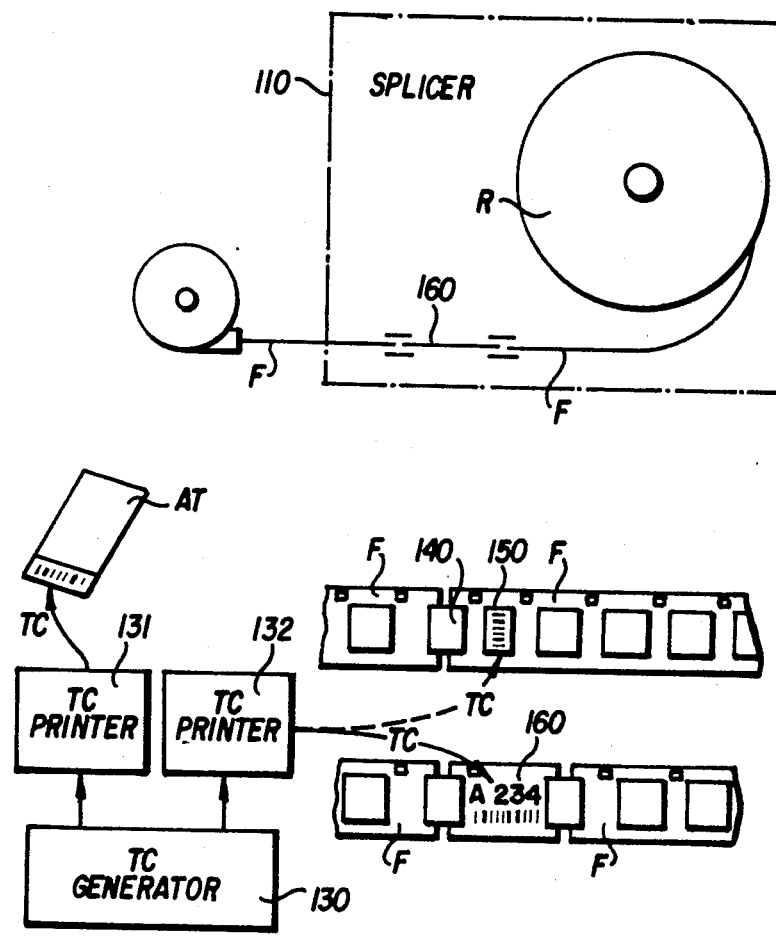
FIGS. 2-4 are schematic diagrams respectively illustrating the characteristic processing steps in the input station in three different applications.
Figure 3:
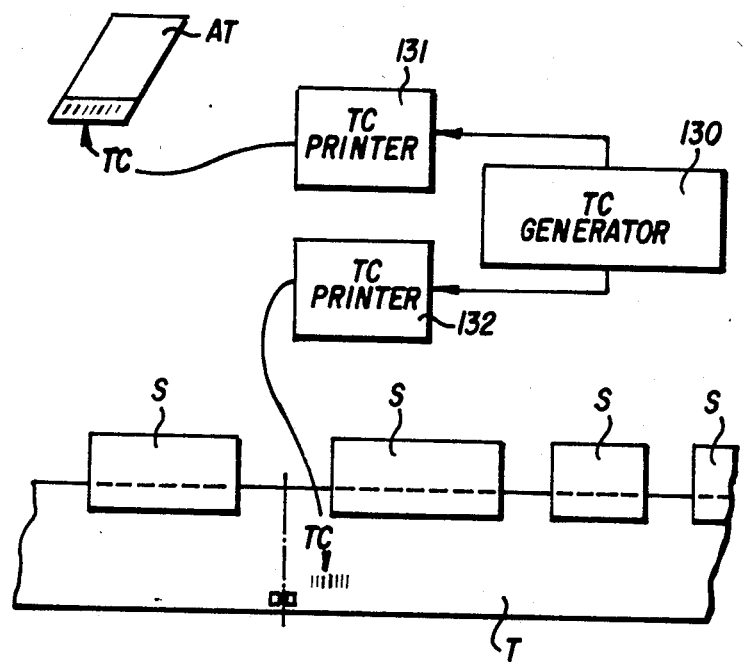

The processing run of the strip or roll films in the form of webs is shown in FIGS. 2 and 3. The input station 100 includes a control number generator 130 and control number applicators 131 and 132 that are controlled by this control number generator. The generator 130 produces for each order a new, sequential control number (twin check number) TC and communicates it to the two applicators 131 and 132. The applicator 131 is a printer which prints the control number TC in the form of a bar code on the order envelope AT. The applicator 132 serves to similarly identify the film. For example, the control number TC may be applied to an initial field 150 of the film F immediately following the splicing location 140. Preferably, however, in the course of splicing short information carrier strips 160 are inserted between two films F and the control numbers TC are printed onto these strips 160, conveniently both in machine readable form and in ordinary script. In the case of reorders (FIG. 3), wherein the films are present in the form of strips S of different lengths and spliced together by means of a carrier web T, the control numbers TC are printed appropriately onto the carrier web T. If the film has not yet been developed (initial order, FIG. 2), the control numbers TC may also be applied optically to the film by means of a suitable configuration of the applicator 132.

Figure 4:
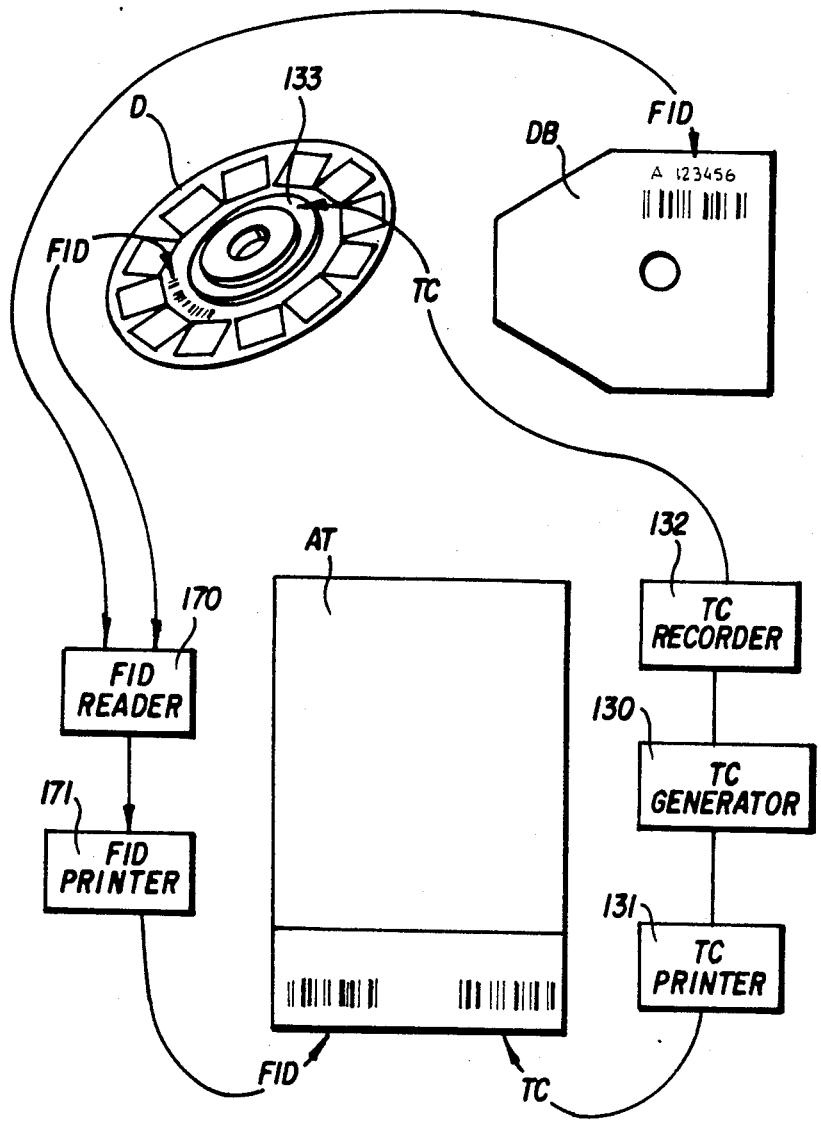

The case of film discs is illustrated in FIG. 4. These are provided with an identification number FID during manufacture. This number is applied both to the circular track on the film D and onto the protective disc container DB in machine readable form and also in ordinary script. For such films, in the input station 100 in addition to the aforementioned control number generator 130 and the two applicators 131 and 132, an ID number reader 170 and an ID number printer 171 are provided. The reader 170 reads the identification number either from the protective container DB or the film disc D itself and communicates it to the printer 171, which in turn prints it onto the order envelope AT. The generator 130 produces, as before, a running control number TC, which is printed by the applicator 131 onto the order envelope AT. The applicator 132, in the form of a magnetic recording device, records the control number TC on a magnetic track 133 provided on the film disc D.

Consequently, in the case of disc films two items of information are transferred to the order envelope AT. However, one of the two pieces of information is sufficient to correlate the envelope and the film (and later the prints produced from the film). Accordingly, the identification number FID previously provided on the film disc D by the manufacturer may be used directly as the control number and hence there is no need to apply it separately to the film. But the use of a separate control number TC has the advantage that it may be chosen consecutively, which in some cases may be desirable or advantageous.

Figure 5:
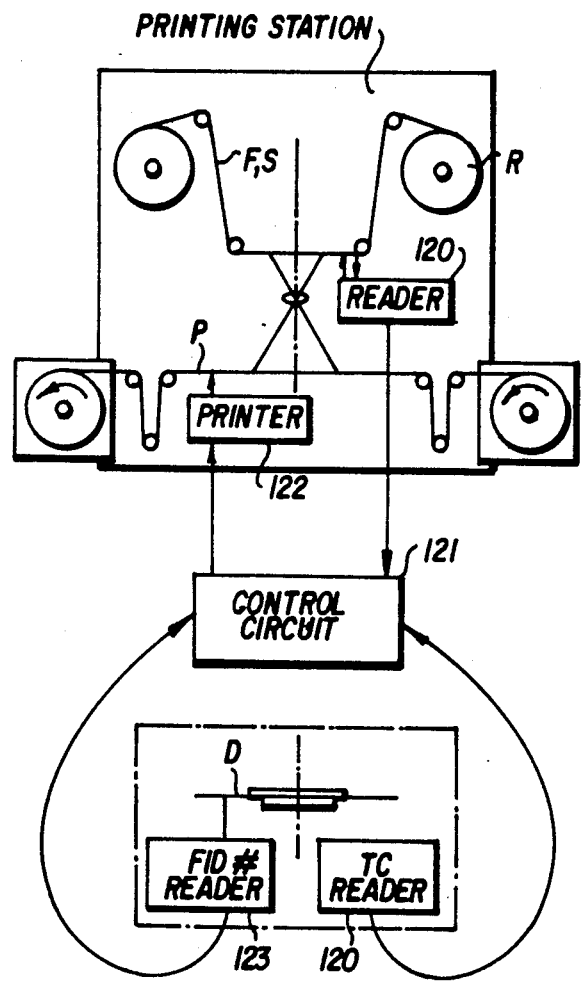
FIG. 5 is a schematic illustration of those parts of a printing station that are incorporated into the invention.

From the input station 100 the films are passed, possibly after developing, to the printing station 200, where the necessary prints are produced in a conventional manner by the appropriate exposure of print paper P (FIG. 5). In order to insure the correlation of the paper prints C with the corresponding order envelopes AT and films F, S or D in the course of final processing, means are provided to read the control numbers TC applied to the films and to transfer them to the print paper P. These means comprise, for conventional strip film, a control number reader 120, a control circuit 121 and a thermal printer 122. For film discs D an additional identification number reader 123 is provided. Naturally, the readers 120 and 123 are adapted to the manner in which the numbers are applied to the films. The thermal printer 122 prints the control number TC (and optionally also the identification number FID) onto the reverse side of the print paper P. To insure the correlation, it is entirely sufficient to apply the number or numbers only once per order, preferably at the beginning of the order. Obviously, it is also possible to print the numbers on each individual paper image.

Figure 6:
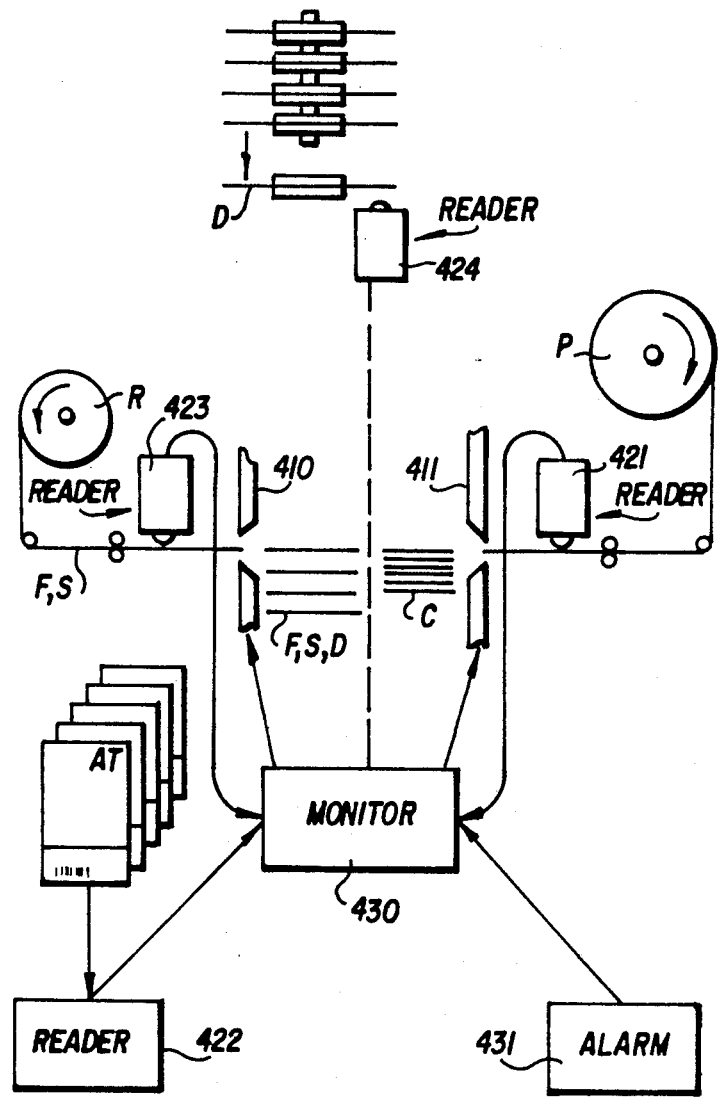
FIG. 6 is a schematic illustration of the final processing station of an apparatus according to the invention.

After printing, the roll of the exposed print paper P passes into the developing station 300 and from there, together with the corresponding roll of film R or stack of film discs D and the empty order envelopes AT, to the final processing station 400 (FIG. 6). Here, in addition to the conventional installations, such as for example cutting tools 410 and 411 for the film and the paper, three readers 421, 422 and 423 for the control numbers TC present on the paper P, the order envelopes AT and the film F, S and D, respectively, are provided, together with a control device 430 connected with these readers. In the case of film disks, a fourth reader 424 can be provided for the ID number FID. The control device monitors and compares the detected control numbers and inhibits the cutting tool, or tools, from operating if there is a lack of agreement indicating an error in the correlation between the film, the paper and the order envelopes. Simultaneously, an alarm 431 can be actuated.

In this manner, the correlation of the film, the order envelopes and the prints is monitored in a fully automatic fashion, which strongly reduces the probability of errors and makes possible a substantially higher throughput.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. In the production of photographic prints according to a customer's order, a process for ensuring the correlation of the customer's order envelope, the corresponding film and the prints produced from the film, comprising the steps of:

identifying the order envelope and the film with a machine-readable control number prior to a printing operation;

reading the control number on the film by machine in a printing station and applying said control number, in a machine-readable form, to the order of prints produced from the film;

reading the control number, by machine, on each of the order envelope, film and print order and comparing the numbers to one another; and initiating a corrective action if the compared numbers do not agree with one another.

2. The process of claim 1 wherein said corrective action includes inhibiting the cutting of at least one of the film and the prints.

3. The process of claim 1 wherein said corrective action includes actuating an alarm indicator.

4. The process of claim 1 wherein said control number includes an identification number applied to the film during its manufacture.

5. The process of claim 4 wherein said film includes a magnetic track and the step of identifying the film includes recording the control number on the magnetic track.

6. The process of claim 1 wherein plural films are combined to form a continuous strip, and the step of identifying the film includes inserting an information strip carrying the control number between adjacent sections of film in the strip.

7. The process of claim 1 wherein the control number is printed on the order of prints in the form of a bar code.

8. Apparatus for ensuring the proper correlation of order envelopes, films and prints in the production of photographic prints, comprising:

an input station wherein films delivered in order envelopes are separated therefrom, said input station including means for identifying each film and the corresponding order envelope with a control number in a machine-readable form;

a printing station wherein a desired number of paper prints is produced from each film, said printing station including means for reading the control number applied to the film and means for applying the same number in a machine-readable form to the order of prints produced from the film; and a final order processing station wherein the order envelopes, films and prints are assembled together, said order processing station including means for reading the control numbers on the order envelopes, films and prints, means for comparing the control numbers with one another, and means for initiating corrective action if the compared numbers are not in agreement with one another.

9. The apparatus of claim 8 wherein said final processing station further includes tools for cutting at least one of the film and the prints, and said corrective action includes inhibiting operation of said cutting tools.

10. The apparatus of claim 8 wherein said input station includes a splicer for combining individual films into a continuous strip, and said identifying means inserts an information strip carrying the control number between adjacent films in said continuous strip.

11. The apparatus of claim 8 wherein said control number is applied to the order of prints in the form of a bar code.

* * * * *